A. SCHINDLER.
Tapping-Guard.
No. 224,231. Patented Feb. 3, 1880.
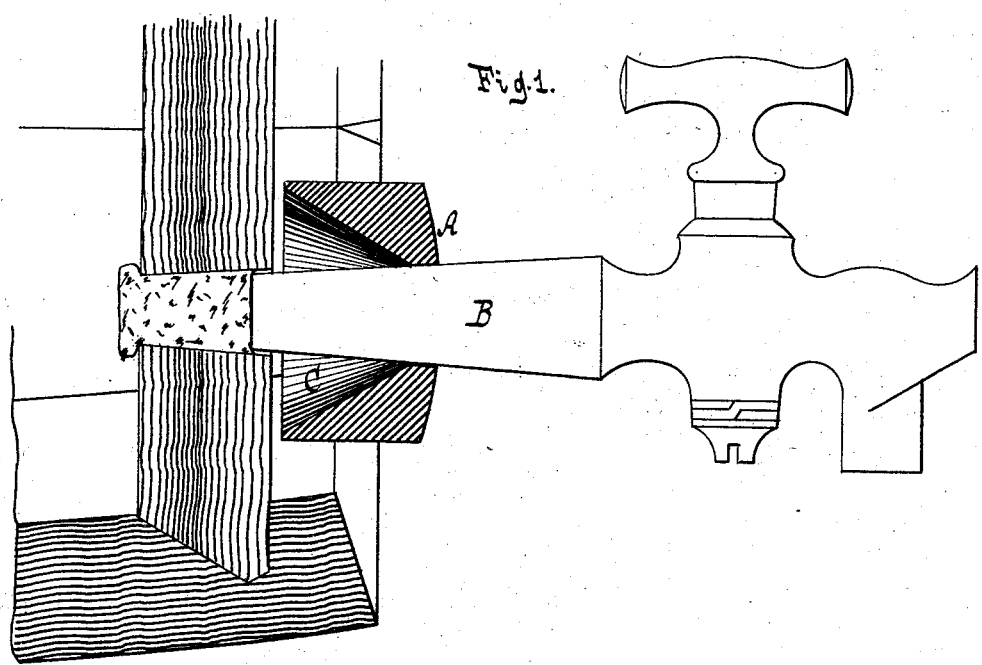
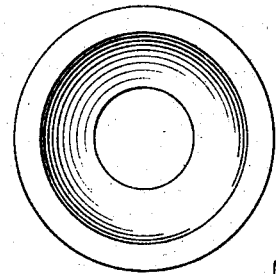
Witnesses
Otto Aufland.
William Miller
Inventor.
Alexander Schindler
by
Van Santvoord & Hauff
his attorneys.

UNITED STATES PATENT OFFICE.

ALEXANDER SCHINDLER, OF NEW YORK, N. Y.

TAPPING-GUARD.

SPECIFICATION forming part of Letters Patent No. 224,231, dated February 3, 1880.

Application filed October 22, 1879.

*To all whom it may concern:*

Be it known that I, ALEXANDER SCHINDLER, of the city, county, and State of New York, have invented a new and useful Improvement in Tapping-Guards, which improvement is fully set forth in the following specification, reference being had to the accompanying drawings, in which—

Figure 1 shows my improved guard as it appears when in practical use. Fig. 2 is an end view thereof.

Similar letters indicate corresponding parts.

My improvement relates to devices for guarding against the usual squirting of liquid from the tap-hole of a barrel during the operation of tapping; and it consists in an india-rubber collar formed in one piece, which is beveled at one end, on its inner edge, to taper outwardly toward said end, the body of the collar thus being cup-shaped and surrounding an approximately conical space, so that when this collar is slipped on the shank of a faucet previous to driving the latter into the tap-hole of a barrel, with its chamfered edge facing the barrel, and the faucet is then driven home, the collar is caused to impinge on the barrel, and being adapted to spread at its inner or chamfered end, it yields to the pressure of the faucet without being expanded to any great extent, so that while it proves an effective barrier to the escape of liquid around the faucet it is extremely durable.

In the drawings, the letter A designates a collar, composing a guard of the nature of my invention, the same being beveled or chamfered on its inner edge at one end, as at C. If, when a barrel containing beer or other liquid is to be tapped, the collar A is slipped over the end of the faucet, as shown in Fig. 1, and the faucet is then driven into the tap-hole of the barrel, the collar is brought in contact with the barrel and becomes spread at its inner or chamfered end, the effect of which is that the escape of liquid is prevented in the best possible manner and the degree of expansion to which the collar is subjected by the faucet is reduced to a minimum.

I am aware that tapping-guards have been made in form of a flanged nipple having a straight or plain inner edge, and I do not claim such; but

What I claim as new, and desire to secure by Letters Patent, is—

As a new manufacture, a tapping-guard consisting of an india-rubber collar formed in one piece and beveled at one end, on its inner edge, to taper outwardly toward said end, whereby it is adapted to yield or spread at such end, substantially as and for the purpose set forth.

In testimony that I claim the foregoing I hereunto set my hand and seal this 20th day of October, 1879.

ALEXANDER SCHINDLER. [L. S.]

Witnesses:
 W. HAUFF,
 OTTO HUFELAND.